United States Patent [19]

Yasui et al.

[11] Patent Number: 4,984,466
[45] Date of Patent: Jan. 15, 1991

[54] SEMICONDUCTOR PRESSURE SENSOR

[75] Inventors: Katsuaki Yasui; Yasuo Tada; Akira Takashima, all of Himeji, Japan

[73] Assignee: Mitsubishi Denki Kabushiki Kaisha, Tokyo, Japan

[21] Appl. No.: 531,428

[22] Filed: May 31, 1990

[30] Foreign Application Priority Data

Jun. 2, 1989 [JP] Japan .............................. 1-65133[U]

[51] Int. Cl.$^5$ .............................. G01L 7/08; G01L 9/06
[52] U.S. Cl. ...................................... 73/721; 29/621.1; 338/4
[58] Field of Search ................. 73/721, 720, 718, 754, 73/DIG. 4, 708; 338/4; 29/621.1

[56] References Cited

U.S. PATENT DOCUMENTS

| | | | |
|---|---|---|---|
| 4,600,912 | 7/1986 | Marks et al. ........................... | 73/720 |
| 4,790,192 | 12/1988 | Knecht et al. .................. | 73/DIG. 4 |
| 4,895,026 | 1/1990 | Tada ...................................... | 73/721 |

Primary Examiner—Donald O. Woodiel
Attorney, Agent, or Firm—Sughrue, Mion, Zinn, Macpeak and Seas

[57] ABSTRACT

A semiconductor pressure sensor comprising two pressure sensing diaphragms attached to a support frame embedded within a bonding agent joining two parts of a housing which defines therein fluid passages in communication with two pressure sensing diaphragms. The support frame includes a support plate portion and terminal portions having the inner ends embedded within the bonding agent and the outer ends projecting outwardly of the bonding agent for external connections. The support frame is formed by cutting a lead frame, which has a support frame portion, terminal portions and a surrounding frame integrally connected together, substantially along the outer contour of the housing except for the terminals. A method for manufacturing the pressure sensor is also disclosed.

2 Claims, 2 Drawing Sheets

SEMICONDUCTOR PRESSURE SENSOR

BACKGROUND OF THE INVENTION

This invention relates to a semiconductor pressure sensor and more particularly to a semiconductor pressure sensor useful in detecting pressure difference of two pressure sources.

One example of the conventional semiconductor pressure sensor is disclosed in Japanese Pat. Laid-Open No. 60-100026 for example, in which two sets of semiconductor pressure sensing units each including a diaphragm portion and four piezo-electric resistor elements connected in a bridge circuit are formed on a single common semiconductor substrate, and in which the fluid of which pressure is to be measured is applied to one of the pressure sensing units and two outputs from the respective bridge circuits are compared to make a subtraction, whereby any error due to residual distortions can be eliminated.

Another example of a semiconductor pressure sensor is disclosed in Japanese U. M. Laid-Open Pat. No. 61-87338. In this conventional pressure sensor, an opening is provided at the central portion cf a base and a pressure introducing conduit extends downwardly from the opening, and other openings for atmosphere are disposed remotely from the central opening. A pressure sensing diaphragm for detecting the pressure difference between the pressure introducing conduit and the atmospheric pressure is centrally disposed, and the opening for the atmospheric pressure is covered by the semiconductor chip which is covered by a cap.

In U.S. Pat. No. 4,895,026 to Tada, a disclosure is made as to a semiconductor pressure sensor comprising a first and a second identical pressure sensing diaphragm each having first and second pressure receiving surfaces and supported to align in a common plane in the same orientation. Two pressure sensing diaphragms have connected thereto similar bridge circuits made of piezoelectric elements for generating electrical signals indicative of the fluid pressure acting on the pressure sensing diaphragms. The semiconductor diaphragms are directly supported on an electrically insulating support frame held in a sensor housing. A first fluid passage connectable to a first pressure source is on communication with the first pressure receiving surface of the first diaphragm and the second pressure receiving surface of the second diaphragm, and a second fluid passage is in communication with a second pressure receiving surface of the first diaphragm and the first pressure receiving surface of the second diaphragm. The two electrical signals are supplied to a differential amplifier where two signals are subtracted and an output electrical signal proportional to the magnitude of the result of the subtracted between the first and the second electrical signals. During assembly, electrical terminals are molded in the housing, and the signal generating elements are mounted to one of the housing halves by the support plate, and then, the inner ends of the terminals and the signal generating elements are electrically connected by wires. These electrical components are covered by the second housing half.

Since the conventional semiconductor pressure sensors are constructed as above described, the support plate and the terminals are separate and discrete components, leading to the need for the separate manufacture and a poor productivity.

SUMMARY OF THE INVENTION

Accordingly, one of the objects of the present invention is to provide a semiconductor pressure sensor free from the above problem.

Another object of the present invention is to provide a semiconductor pressure sensor which can be easily manufactured by simple steps.

Further object of the present invention is to provide a semiconductor pressure sensor which is simple in structure.

With the above objects in view, the pressure sensor of the present invention comprises a first and a second identical pressure sensing diaphragms each having first and second pressure receiving surfaces and supported to align in a common plane in the same orientation. Two pressure sensing diaphragms have connected thereto similar bridge circuits made of piezoelectric elements for generating electrical signals indicative of the fluid pressure acting on the pressure sensing diaphragms. The semiconductor diaphragms are attached to a support frame embedded within a bonding agent joining two parts of a housing which defines therein fluid passages in communication with two pressure sensing diaphragms. The support frame includes a support plate portion and terminal portions having the inner ends embedded within the bonding agent and the outer ends projecting outwardly of the bonding agent for external connections The support frame is formed by cutting a lead frame having a support frame portion and terminal portions substantially along the outer contour of the housing except for the terminals.

BRIEF DESCRIPTION OF THE DRAWINGS

The present invention will become more readily apparent form the following detailed description of the preferred embodiments of the present invention taken in conjunction with the accompanying drawings, in which.

DESCRIPTION OF THE PREFERRED EMBODIMENT

Figure 1:
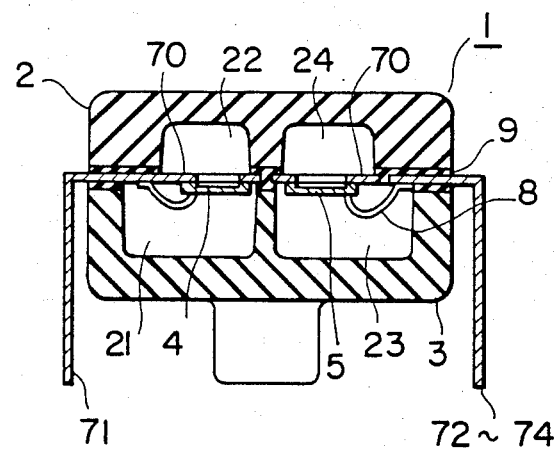
FIG. 1 is a sectional view of a semiconductor pressure sensor constructed in accordance with the present invention.
Figure 2:
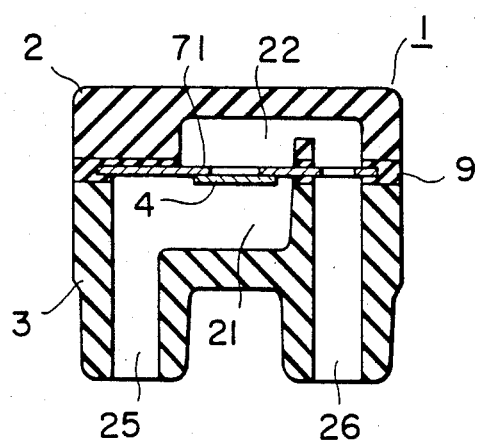
FIG. 2 is a sectional view of the semiconductor pressure sensor of the present invention.

In FIGS. 1 and 2, the semiconductor pressure detector of the present invention comprises a housing 1 having a first housing part 2 and a second housing part 3. The housing 1 defines therein a first pressure chamber 21, a second pressure chamber 22, a third pressure chamber 23 and a fourth pressure chamber 24.

It is seen that a semiconductor chip 4 having a diaphragm is disposed at an interface between the first and the second housing parts 2 and 3 so that it defines a partition wall between the first and the second pressure chamber 21 and 22.

In a similar manner, a semiconductor chip 5 having a diaphragm is disposed at an interface between the first and the second housing parts 2 and 3 so that it defines a partition wall between the third and the fourth pressure chamber 23 and 24.

These semiconductor chips 4 and 5 are mounted to a support plate 70 made of an electrically conductive sheet material. Thus, the arrangement is such that the diaphragm of the semiconductor chip 4 receives the pressure within the first and the second pressure chambers 21 and 22 and the diaphragm of the semiconductor chip 5 receives the pressure in the third and the fourth pressure chambers 23 and 24.

Figure 3:
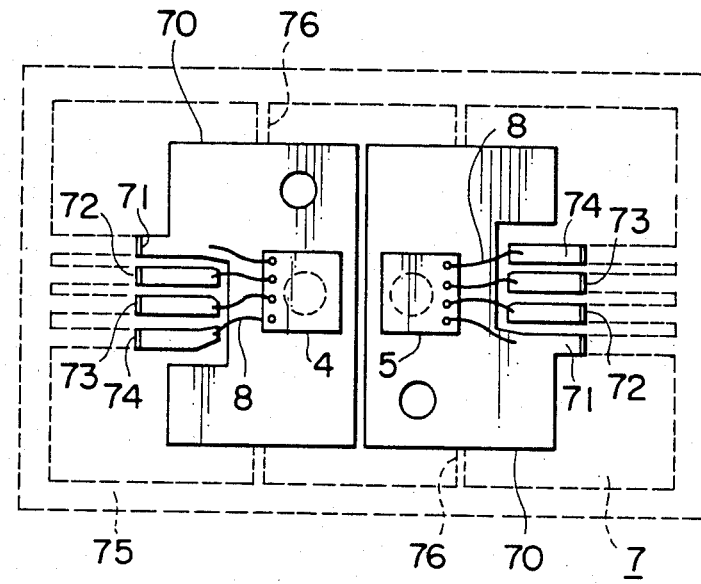
FIG. 3 is a plan view of the lead frame type support frame used in the semiconductor pressure sensor of the present invention.

FIG. 3 is a plan view of a lead frame 7 with the semiconductor chips 4 and 5 bonded thereon before the lead frame 7 is assembled between the housing halves 4 and 5. It is seen that the lead frame 7 is cut into its final shape as illustrated by solid lines and a surrounding frame portion 75 illustrated by dash lines is removed.

As seen from FIG. 3, the semiconductor chips 4 and 5 are bonded to the support plates 70, and the respective semiconductor chips 4 and 5 are electrically connected to two sets of terminals 71–74 through connecting wires 8.

It is seen that the terminals 71 are integral with the support plates 70, and the other terminals 72–74 are separate from the support plates 70 but integral with the surrounding frame 75 is illustrated by dash lines before they are cut and bent as illustrated in FIGS. 1 and 3. Each of the support plates 70 is also integrally connected and supported through bridges 76 by the frame 75 before assembly. Thus the lead frame 7 is composed of two support plates 70, eight terminals 71–74 and the surrounding frame 75.

In assembly, as illustrated in FIGS. 1 and 2, the lead frame 7 with the semiconductor chips 4 and 5 bonded on the support plates 70 is placed between the housing halves 2 and 3 each having applied on the mating surfaces a layer 9 of a bonding agent and he terminals 71–74 as well as the bridges 76 are cut to separate the support plate 70 and the terminals 71–74 from the surrounding frame 75. Then, the terminals 71–74 are bent for easy connection to an external circuit (not shown).

The basic structure and the operation of the pressure sensor is similar to the arrangement disclosed in U.S. Pat. No. 4,895,026 to Tada which is incorporated herein by reference.

As has been described, according to the present invention, the semiconductor pressure sensor comprises a support frame holding semiconductor pressure sensing diaphragms. The support frame is embedded within a bonding agent joining two parts of a housing which defines therein fluid passages in communication with two pressure sensing diaphragms. The support frame includes a support plate portion and terminal portions having the inner ends embedded within the bonding agent and the outer ends projecting outwardly of the bonding agent for external connections. The support frame is formed by cutting a lead frame having a support frame portion and terminal portions substantially along the outer contour of the housing except for the terminals.

Accordingly, the support plate and the terminals are cut from a single integral lead frame during manufacture into separate and discrete components, so that the productivity of the pressure sensor is significantly improved and the cost is decreased. Also the semiconductor pressure sensor has a simple structure and can be easily manufactured by a simple steps which leads to an improved reliability.

What is claimed is:

1. A semiconductor pressure sensor comprising:
   first and second identical pressure sensing diaphragms each having first and second pressure receiving surfaces and supported to align in a common plane in the same orientation;
   a housing including at least two parts connected by a bonding agent to define therein fluid passages in communication with said pressure sensing diaphragms; and
   an electrically conductive support frame supporting said pressure sensing diaphragms and embedded within said bonding agent between two parts of said housing, said support frame including a support plate portion and terminal portions having inner ends embedded within the bonding agent and outer ends projecting outwardly of the bonding agent for external connections, said support frame being formed by cutting a lead frame having a support frame portion and terminal portions substantially along an outer contour of the housing except for the terminals.

2. A method for manufacturing a semiconductor pressure sensor as claimed in claim 1, comprising the steps of:
   preparing an electrically conductive lead frame having a support plate for supporting a semiconductor pressure sensing diaphragm, n electrical terminal for external connection and a holding frame integrally connected and holding said support pate and said terminal;
   attaching a pressure sensing diaphragm to said support plate;
   electrically connecting said pressure sensing diaphragm to said terminals;
   bonding said lead frame between at least two parts of a housing which defines therein fluid passages in communication with said pressure sensing diaphragms with a bonding agent therebetween with said terminal of said lead frame partly extended outwardly of said housing; and
   cutting said lead frame substantially along the outer contour of said housing except for the outwardly extending terminals.

* * * * *